(12) United States Patent
Levy

(10) Patent No.: US 8,650,770 B1
(45) Date of Patent: Feb. 18, 2014

(54) AIR CYCLE HEAT PUMP DRYER

(76) Inventor: George Samuel Levy, San Diego, CA (US)

(*) Notice: Subject to any disclaimer, the term of this patent is extended or adjusted under 35 U.S.C. 154(b) by 419 days.

(21) Appl. No.: 13/158,442

(22) Filed: Jun. 12, 2011

Related U.S. Application Data

(60) Provisional application No. 61/355,857, filed on Jun. 17, 2010.

(51) Int. Cl.
*F26B 3/00* (2006.01)

(52) U.S. Cl.
USPC ........... 34/454; 34/595; 34/219; 34/610; 68/23 R; 8/159; 62/271; 60/698

(58) Field of Classification Search
USPC .......... 34/454, 474, 515, 134, 218, 219, 595, 34/601, 610; 68/19, 20, 23 R; 8/137, 149, 8/159; 62/93, 271; 60/517, 698
See application file for complete search history.

(56) References Cited

U.S. PATENT DOCUMENTS

| | | | |
|---|---|---|---|
| 3,238,754 A | 3/1966 | Candor et al. | |
| 3,376,652 A * | 4/1968 | Hernandez, Jr. | 34/292 |
| 4,026,035 A | 5/1977 | Dyer et al. | |
| 4,041,614 A | 8/1977 | Robinet | |
| 4,057,907 A | 11/1977 | Rapino et al. | |
| 4,189,848 A * | 2/1980 | Ko et al. | 34/473 |
| 4,257,173 A | 3/1981 | Smith | |
| 4,305,211 A | 12/1981 | Peterson | |
| 4,603,489 A | 8/1986 | Goldberg | |
| 4,615,125 A | 10/1986 | Wyborn | |
| 4,621,438 A | 11/1986 | Lanciaux | |
| 5,048,200 A * | 9/1991 | Ryham | 34/473 |
| 5,119,640 A | 6/1992 | Conrad | |
| 5,131,169 A | 7/1992 | Jaster | |
| 5,459,945 A | 10/1995 | Shulenberger | |
| 5,724,750 A | 3/1998 | Burress | |
| 5,899,003 A * | 5/1999 | Strommen et al. | 34/363 |
| 6,272,770 B1 | 8/2001 | Slutsky et al. | |
| 6,370,798 B1 | 4/2002 | Gonzalez, Sr. | |
| 6,490,874 B2 | 12/2002 | Chu et al. | |
| 6,868,621 B1 | 3/2005 | Grimm et al. | |
| 7,234,247 B2 | 6/2007 | Maguire | |
| 2005/0246920 A1 | 11/2005 | Yabuuchi et al. | |
| 2006/0179676 A1 * | 8/2006 | Goldberg et al. | 34/77 |
| 2007/0107255 A1 * | 5/2007 | Tamura et al. | 34/475 |
| 2008/0034607 A1 | 2/2008 | Ahn et al. | |

(Continued)

FOREIGN PATENT DOCUMENTS

| | | | | |
|---|---|---|---|---|
| DE | 3927409 A1 * | 2/1991 | | B01D 53/26 |
| EP | 323001 A1 * | 7/1989 | | B01D 53/14 |

(Continued)

*Primary Examiner* — Steve M Gravini
(74) *Attorney, Agent, or Firm* — George S. Levy

(57) ABSTRACT

This invention is a method and apparatus for drying wet objects, comprising passing air through the wet objects thereby having air absorb moisture from said wet objects; compressing the air adiabatically, thereby heating it; extracting heat from the air by passing it through the hot side of a heat exchanger thereby cooling it; expanding the air adiabatically, thereby cooling it further, below its dew point; separating the condensate from the air; restoring to the air all or part of the heat by passing it through the second side of the heat exchanger; and redirecting all or part of the air back to the wet objects thereby forming a loop in the flow of the air.

20 Claims, 9 Drawing Sheets

(56) References Cited

U.S. PATENT DOCUMENTS

| | | |
|---|---|---|
| 2008/0034608 A1 | 2/2008 | Ahn et al. |
| 2008/0155985 A1* | 7/2008 | Labrador .................. 60/698 |
| 2009/0094852 A1 | 4/2009 | Tatsumi et al. |
| 2009/0113740 A1 | 5/2009 | Grunert et al. |
| 2010/0011608 A1 | 1/2010 | Grunert et al. |
| 2010/0037480 A1 | 2/2010 | Steffens |
| 2010/0050703 A1 | 3/2010 | Maekawa et al. |
| 2010/0132216 A1 | 6/2010 | Krausch et al. |
| 2011/0154676 A1* | 6/2011 | Castiglione et al. ............. 34/86 |
| 2011/0167664 A1* | 7/2011 | Favret et al. .................... 34/134 |
| 2013/0180125 A1* | 7/2013 | Shu et al. ....................... 34/406 |

FOREIGN PATENT DOCUMENTS

| | | | | |
|---|---|---|---|---|
| FR | 2771661 A1 | * | 6/1999 | ............. B08D 7/00 |
| JP | 01212599 A | * | 8/1989 | ............. D06F 58/02 |
| JP | 2012075824 A | * | 4/2012 | |

\* cited by examiner

AIR CYCLE HEAT PUMP DRYER

FIELD OF THE INVENTION

This invention claims the benefit of US Provisional Application No. 61/355,857 titled "Air Cycle Heat Pump Clothes Dryer" filed on Jun. 17, 2010, which is hereby incorporated by reference (see additional incorporations by reference in paragraph below). Applicant claims priority pursuant to 35 U.S.C. Par 119(e)(i). The present invention relates to dryers, more particularly to clothes dryers which utilize a heat pump.

US Patent Application 2007/0256430 filed by Prueitt is hereby incorporated by reference. U.S. Pat. No. 7,726,960 by Kim Tiow Oui is also incorporated by reference.

BACKGROUND

In a traditional dryer shown in FIG. 1, clothes are placed in a rotating tumbler. Air from the outside is drawn in, heated, circulated through the tumbler and vented outside.

Even though the basic design is simple, reliable, and cheap, the high operating temperature (about 180 F) causes lint to form and clothes to shrink. In addition, this basic design requires venting ducts to the outside to prevent the buildup of high indoor humidity. It is inherently inefficient because no attempt is made to recycle the heat that is applied to the laundry load.

Just as in a traditional dryer, a condenser dryer illustrated in FIG. 2 requires that heated air pass through the load. However, instead of venting this air outside, the dryer uses a heat exchanger to cool the air and condense the water vapor. After the water is extracted, the air is heated and goes through the loop again. The heat exchanger uses as its coolant, ambient air which is vented in the immediate surroundings; alternatively it may use cold water, resulting in increased water usage.

Even though condenser dryers are "closed loop" requiring no venting of the humid air from the laundry, they do not recycle heat energy and their heat exchangers still dump heat in the environment. They are about 15% less efficient than conventional clothes dryers because of inefficiency introduced by the heat exchanger.

In a heat pump dryer shown in FIG. 3 heat energy is recycled. The same heat pump is used simultaneously to cool the air leaving the tumbler and to heat the air entering the tumbler. Such dryers not only avoid the need for ducting, but also conserve much of their heat within the dryer instead of exhausting it into the surroundings. Heat pump dryers can therefore use less than half the energy required by either condensation or traditional dryers.

Disadvantages of heat pump dryers include their need for two heat exchangers and their reliance on hydrochlorofluorocarbon (HCFCs) refrigerant fluids such as R-22 or R-134a. These fluids have been shown to be 2000 times more powerful than carbon dioxide at causing global warming. Their predecessors, the Chlorofluorocarbons (CFCs) such as Freon™, were banned because of their deleterious effect on the ozone layer. There is therefore a strong incentive to eliminate these chemicals from devices using a heat pump such as clothes dryers and, air conditioners. The proposed technology is an improvement to, and is more efficient, simple, compact and environmentally friendly than, the heat pump dryer.

Vacuum dryers are the subject of numerous patents. However, very little of this technology has reached the market because of their slow drying speed. Little consideration is given in the prior art to how the heat flows: as water evaporates, heat of vaporization is provided by the clothes which get colder, slowing down the evaporation process. Heating the clothes, a possible solution, is inefficient and does not address the issue of recycling the heat energy. Another problem is their need for a strong sealed vacuum chamber to enclose the tumbler and the possibility of implosion should this chamber fail.

Microwave dryers operate around 2.45 GHz. At this frequency microwaves have the interesting property of being selectively absorbed by water and are appropriate for food items. Unfortunately the presence of metal in clothing could result in sparking and fires, making microwaves unacceptable for laundry applications. No clothes dryer described in the prior art, however, offers the economy, reliability, efficiency and environment sustainability of the present invention. Further features, aspects, and advantages of the present invention over the prior art will be more fully understood when considered with respect to the following detailed description and claims.

SUMMARY OF THE INVENTION

Figure 1:
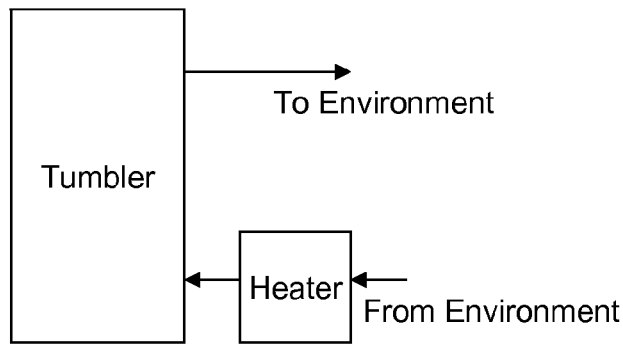
FIG. 1 is prior art and illustrates the construction of a traditional clothes dryer comprising of a tumbler and an air heater module.
Figure 1A:
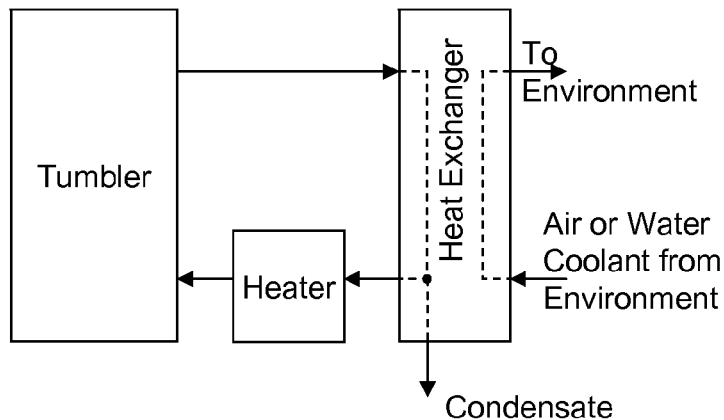
FIG. 1A is prior art and shows a condenser clothes dryer comprising a tumbler and a heat exchanger.
Figure 1B:
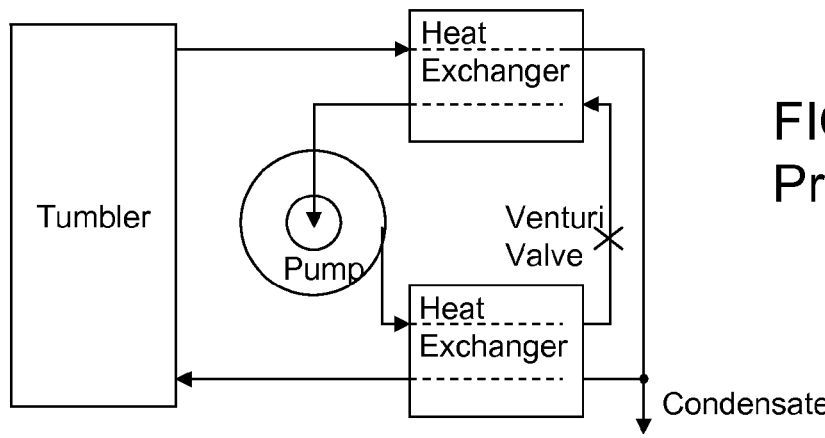
FIG. 1B is prior art and shows a dryer utilizing a heat pump comprising a pump and a Venturi valve.

The proposed dryer technology is an improvement to the conventional heat pump dryer. It is more efficient, simpler and environmentally safer. The refrigerant cycle, based on a hydrochlorofluorocarbon-based fluid in a conventional heat pump dryer, is replaced in the proposed system by an air cycle, thereby eliminating one heat exchanger and shortening the path of the heat flow. Instead of having to traverse four boundary layers and two heat exchanger walls (air/wall/fluid, fluid/wall/air), heat needs to cross only two boundary layers and one wall (air/wall/air) resulting in heightened efficiency, simplicity and compactness. In addition, the need for a hydrochlorofluorocarbon refrigerant fluid having a global heat warming capacity 2000 times greater than carbon dioxide is eliminated. The proposed dryer can be closed loop, requiring no venting or exhaust. Because both heat and mechanical energy can be regenerated, it produces little heat compared to other dryers. Assuming ideal conditions such as no friction and no turbulence, it can operate in a thermodynamically reversible fashion and approach the maximum thermodynamically allowed efficiency.

In one embodiment of the proposed invention, air goes through the following:

1. The air from the tumbler and laden with moisture is directed through a pump also named compressor which adiabatically compresses and heats it. The terms compressor and pump shall be used interchangeably.
2. The hot compressed and humid air then traverses the hot side of a heat exchanger where it loses its heat energy.
3. The air is then allowed to expand adiabatically through a Venturi valve where it loses more energy, cooling to a temperature significantly below its dew point.
4. The cold air filled with condensed water is then directed through a separator (for example a cyclone) that extracts the liquid water condensate.
5. The air is then fed back into the cold side 6 of the heat exchanger, where it recaptures some of the heat that it has previously lost;
6. The warm air is then blown through the wet laundry in the tumbler 1 where it acquires some moisture.
7. Finally the air is directed back to the pump, thus closing the loop.

An alternative design utilizes a turbo compressor and turbine in lieu of a pump and a Venturi valve, thereby recycling mechanical energy in addition to the heat energy already recycled by the heat exchanger.

The invention also includes a method of drying wet objects, comprising:

a. passing air through the wet objects. This step allows the air to absorb moisture from the wet objects;
b. compressing the air. Adiabatic compression results in heating of the air;
c. extracting heat from the air by passing it through the hot side of a heat exchanger. This step cools the air;
d. expanding the air. This step cools the air even further, below its dew point;
e. separating condensate from the air;
f. restoring all or part of the heat that has been extracted to the air by passing it through the heat exchanger's cold side. This step heats the air.
g. redirecting all or part of the air back to the wet objects thereby forming a loop in the flow of the air.

Other alternatives also comprise a heater that heats the air before it enters the tumbler enclosure; a bleed valve located after the compressor, for creating a partial vacuum within the tumbler enclosure to speed up the evaporation of water; a secondary heat exchanger located after the Venturi valve or after the turbine for removing additional heat from the air, wherein this secondary heat exchanger can have its cold side connected to a source of cool fluid such as tap water; and a valve system to bleed air off the loop or inserting air in the loop depending on whether outside air has better drying capacity than the air in the loop.

DETAILED DESCRIPTION

Figure 2:
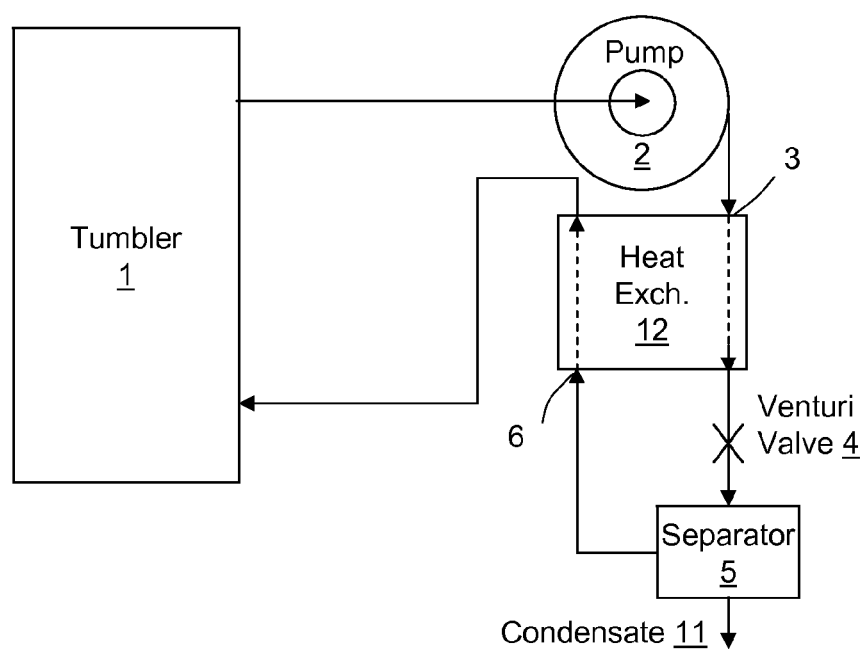
FIG. 2 illustrates a possible implementation of this invention. It comprises a tumbler, a pump and a heat exchanger.

An embodiment of the invention is illustrated in FIG. 2. Clothes are placed in an enclosed tumbler 1. The air which is blown through it goes through the following:

1. The air from the tumbler and laden with moisture is directed through a pump 2 which adiabatically compresses and heats it.
2. The hot compressed and humid air then traverses the first side 3 of a heat exchanger where it loses its heat energy.
3. The air is then allowed to expand adiabatically through a Venturi valve 4 where it loses more energy, cooling to a temperature significantly below its dew point.
4. The cold air filled with condensed water is then directed through a separator 5 (for example a cyclone) that extracts the liquid water condensate.
5. The air is then fed back into the second side 6 of the heat exchanger, where it recaptures some of the heat that it has previously lost;
6. The warm air is then blown through the wet laundry in the tumbler 1 where it acquires some moisture.
7. Finally the air is directed back to the pump 2, thus closing the loop.

This dryer implementation has noteworthy differences with a conventional heat pump dryer:

1. Air is used as a refrigerant fluid instead of a global warming Hydrochlorofluorocarbon (HCFC) fluid, making this dryer more eco-friendly. These compounds have been found to be 2000 times more powerful than carbon dioxide as global warming gases.
2. This dryer is simpler and more compact because it has one heat exchanger 12 instead of two.
3. It is more efficient than a conventional heat pump dryer because heat needs to cross only two boundary layers and a single heat exchanger wall (air/wall/air) instead of four boundary layers and two heat exchanger walls (air/wall/fluid, fluid/wall/air). Greater efficiency results in less heat dumped into the environment.

Figure 3:
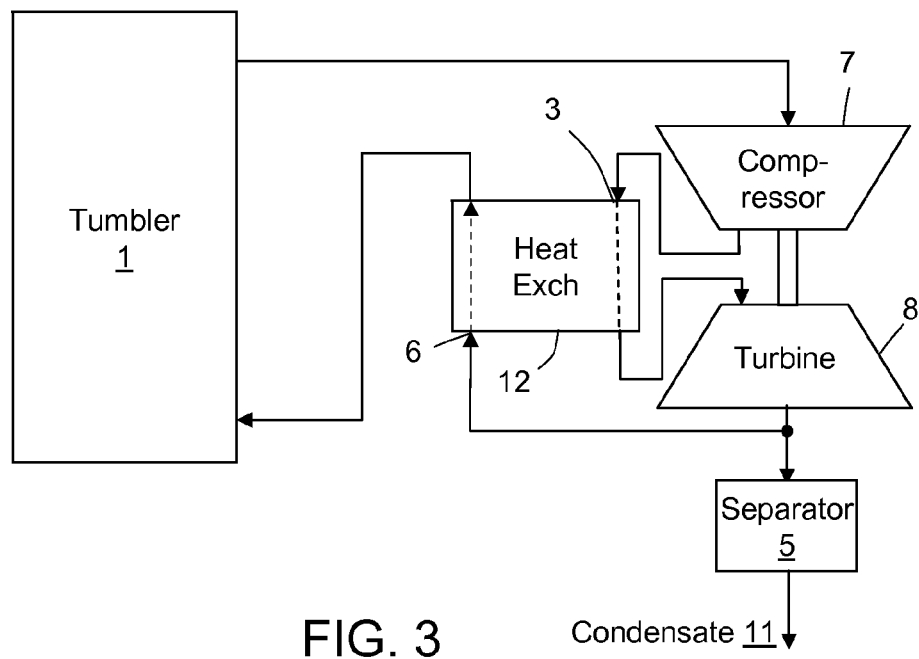
FIG. 3 provides an illustration of an alternative embodiment comprising a turbo-compressor and a turbine.

An alternative version of this invention is presented in FIG. 3, which makes use of the well known inverted Brayton cycle. This version is similar to the first, except that the pump is replaced by a turbo compressor 7 and the Venturi valve 4 by a turbine 8. This approach allows the mechanical energy generated by the air as it expands through the turbine 8 to be recycled back to the compressor 7 through a common axle between the compressor 7 and the turbine 8. One should note that this version is thermodynamically reversible assuming no friction, no turbulence and a perfect heat exchanger, and, therefore, in theory, it has the highest possible efficiency and the lowest heat generation. Heat is recycled by the heat exchanger 12 and mechanical energy is recycled by the compressor 7 and turbine 8. The heat of vaporization of water is recovered since the condensate 11 is liquid. In the limit when there is no temperature difference between the laundry and the condensate 11, the required energy is zero. Of course, this is an ideal case: system inefficiencies do exist and the process must be driven forward and, therefore, energy must be expended. However, this argument points to the potential for high efficiency and low thermal emission by the proposed dryer.

The compressor 7 and turbine 8 combination operating a Brayton cycle is a mature technology. A study [1] has been conducted by Gui, Reinarts and Scaringe for the US Air Force to develop high speed, low flow rate centrifugal compressors for air-conditioning application in aircraft. The same type of compressor can be used for the proposed dryer. Conventional ball bearings can be used. Advances in bearing technology, more particularly in magnetic bearings, make this compressor/turbine combination very efficient and reliable. Turbo compressor and turbine technology is well known and will not add significant risk to this approach.

In this alternate embodiment, the performance of the dryer depends on the performance of the compressor 7 and turbine 8 which in turn depends on the type of bearings they employ. A lot of information can be found in the literature regarding such bearings, in particular bearings used for centrifuge and ultra centrifuge and bearings used in turbochargers. Of particular interest are conventional ball bearings, active magnetic bearings (which are relatively expensive), passive magnetic bearings and air foil bearings. If magnetic bearings are used it may be advantageous to combine the bearing mechanism with the electric drive mechanism. Mohawk Innovative Technology Inc. is one of the manufacturers of air foil bearings and hybrid foil magnetic bearings.

As is well know to persons versed in the art, the turbocompressor and turbine combination is one of several possible methods of compressing and decompressing air, which include reciprocating pumps and rotary devices. For example one could use a rotary compressor such as the kind described in U.S. Pat. No. 7,726,960 by Kim Tiow Oui, which is incorporated by reference.

Figure 4:
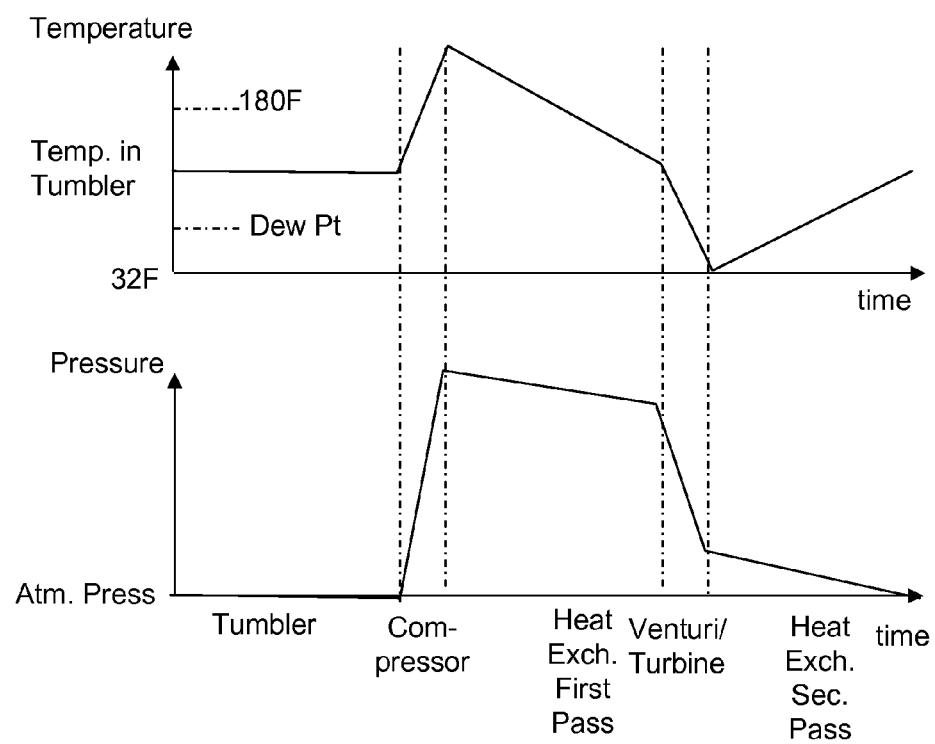
FIG. 4 presents time graphs of expected changes in temperature and pressure of the air as it goes around the cycle.

FIG. 4 shows n example of how temperature and pressure are changing around the air cycle loop.

Hybrid approaches are also possible. For example, the embodiments discussed above do not utilize a heater (as traditional dryers do) and a vacuum (as vacuum dryers). However, these features are not incompatible with this invention and can easily be incorporated in the following four embodiments of the invention illustrated in FIG. 5.

A filter 15 can be added after the tumbler to remove material such as lint if the objects being dried are clothes.

The drying speed can be speeded up by passing the air through a heater 9 before it enters the tumbler 1.

Figure 5:
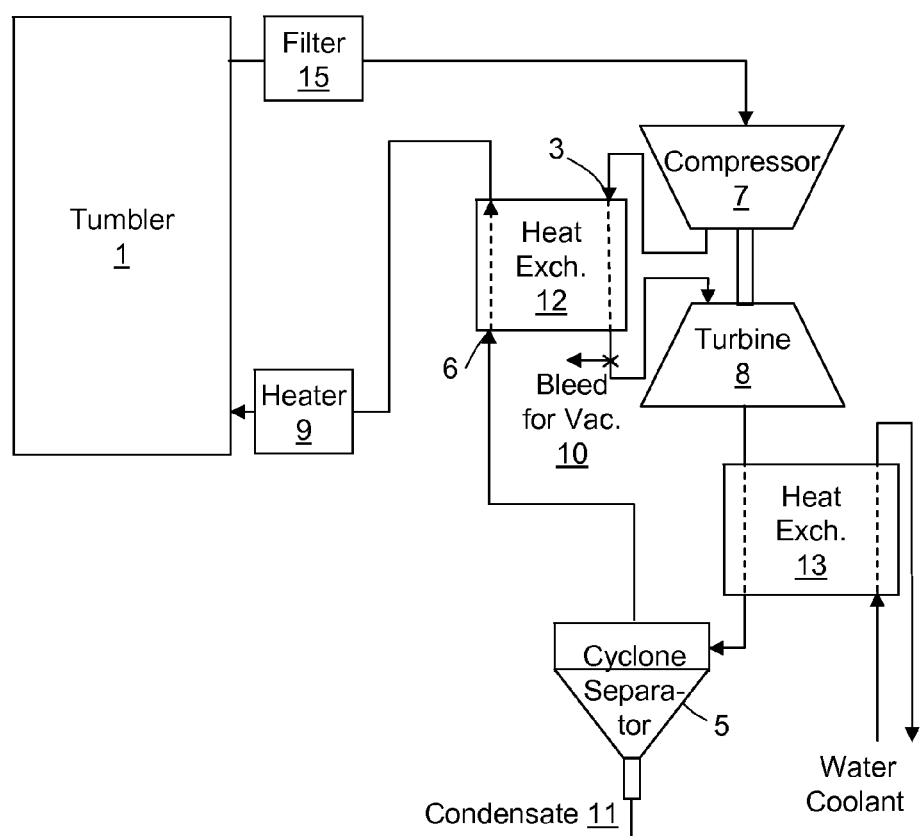
FIG. 5 illustrates hybrid approaches which may include a heater to provide heat to the air before it enters the tumbler, a bleed-off valve to create a vacuum in the tumbler enclosure, a supplemental heat exchanger to further cool the air and valves to convert the closed loop into an open loop.

The drying speed can also be speeded up by creating a partial vacuum in the tumbler 1. This can be done in the first embodiment (pump and Venturi valve) by bleeding off air after the pump 2 stage by means of a bleed valve 10, or, as shown in FIG. 5 for the second embodiment (turbo compressor 7 and turbine 8), by adjusting the operation of the compressor 7 and turbine 8. The trade-off, of course, is that the container holding the tumbler must be sturdily built and its door must include a vacuum seal. In addition the lower heat capacity of the air at low pressure slows down the drying process.

The technique used in condenser clothes dryers can be borrowed by adding a secondary heat exchanger 13 that uses water to cool the circulating air. The trade-off in this case is that heat is dumped in the environment.

Figure 5A:
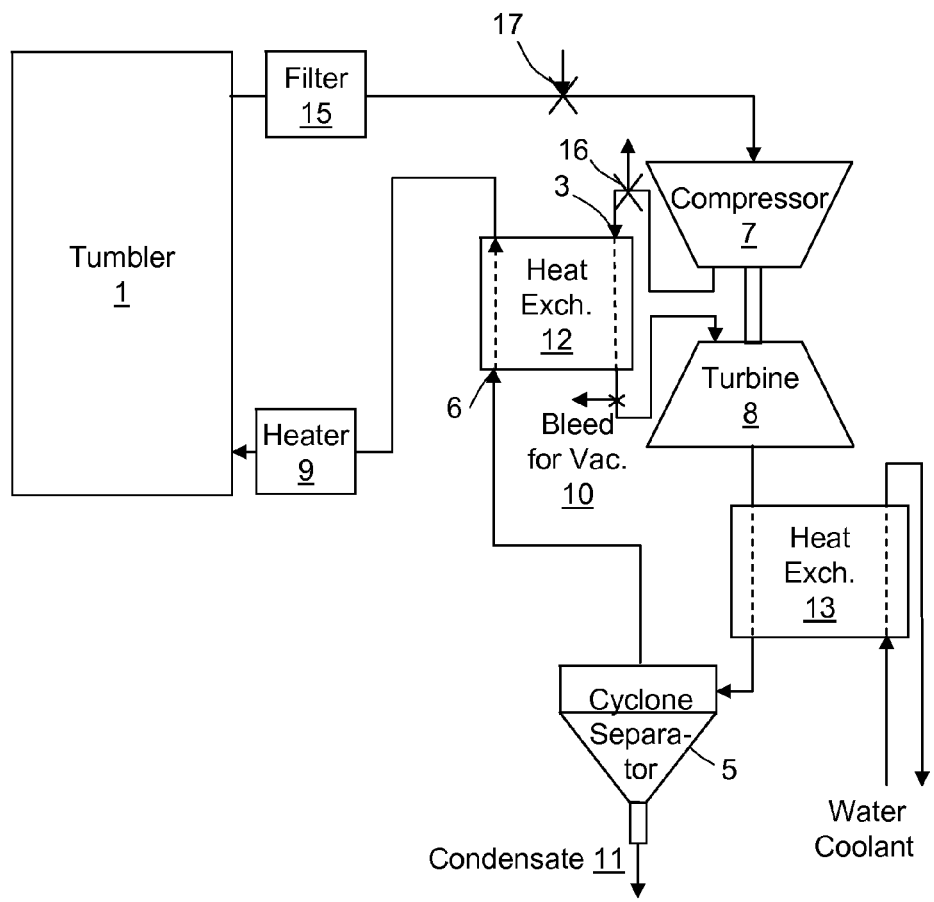
FIG. 5A illustrates how a bleed valve positioned at a high pressure point and an air insert valve located at a low pressure point can be used to operate the device in a partially open loop mode.
Figure 5B:
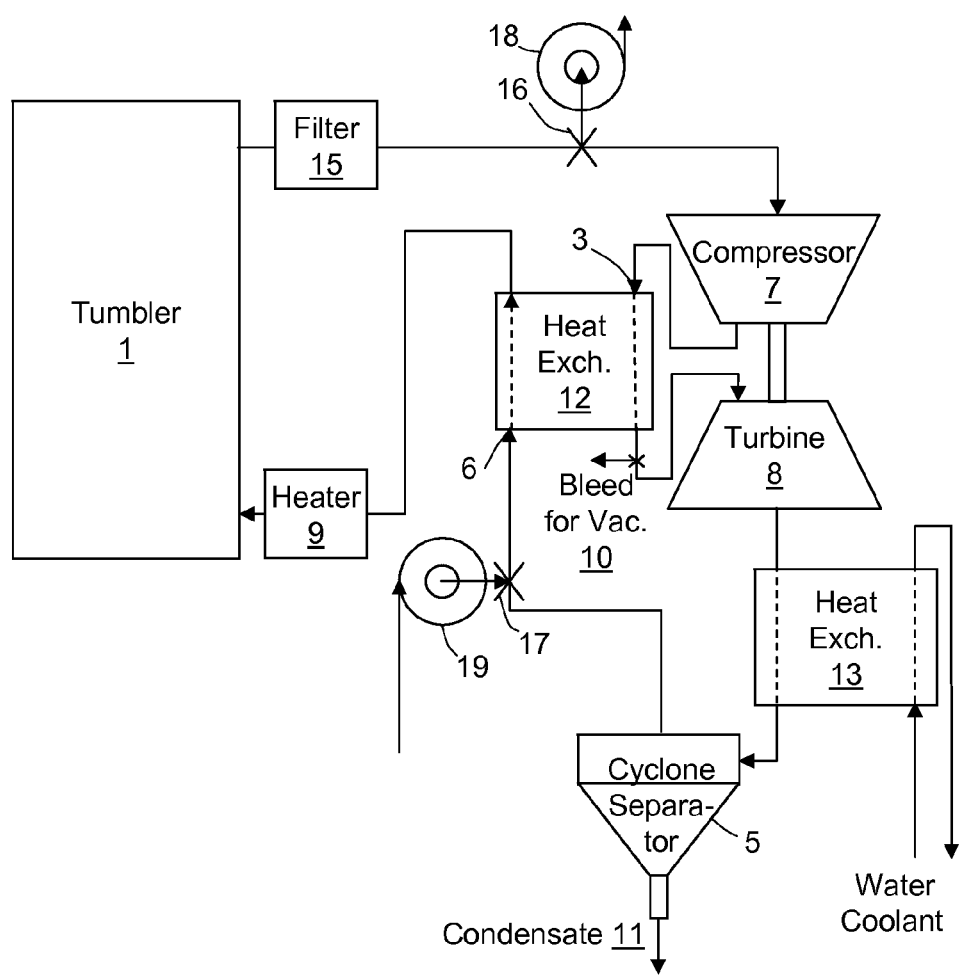
FIG. 5B illustrates how a bleed valve assisted by a pump and positioned at a low pressure point and an air insert valve assisted by a pump and located at a high pressure point can be used to operate the device in a partially open loop mode.

The dryer could be operated in a fully closed loop or in a partially open loop. The air at any point around the loop may have a lower drying capacity than outside air, this drying capacity being a function of its relative humidity and temperature. If the drying capacity of the air at any point in the loop is higher than that of the outside air, then it is preferable to operate in a closed loop fashion. Otherwise, it is more efficient to open the loop and replace some or all of the air at that point in the loop by air from outside (unless there is no convenient venting or exhaust for the dryer, as in a submarine or to save space, in a building). Open loop operation shown in FIG. 5A is implemented by the insertion of valves 16 and 17 designed to switch the configuration of the loop from closed to open. For example, the bleed off valve 16 can be located where pressure is high, that is, immediately after the compressor, and the air insertion valve 17 can be located where pressure is low, that is, immediately before the compressor. Such valves can also be located at other points around the loop but the air would have to be actively bled or inserted by separate pumps. For example as shown in FIG. 5B a bleed off valve 16 could be located immediately before the compressor to get rid of air laden with moisture, but, because of the low pressure, a separate pump 18 would have to be installed to force air outside. Similarly an air insertion valve 17 could be installed immediately after the separator but, because of the high pressure, a separate pump 19 would have to be installed to force air inside the loop.

Figure 5C:
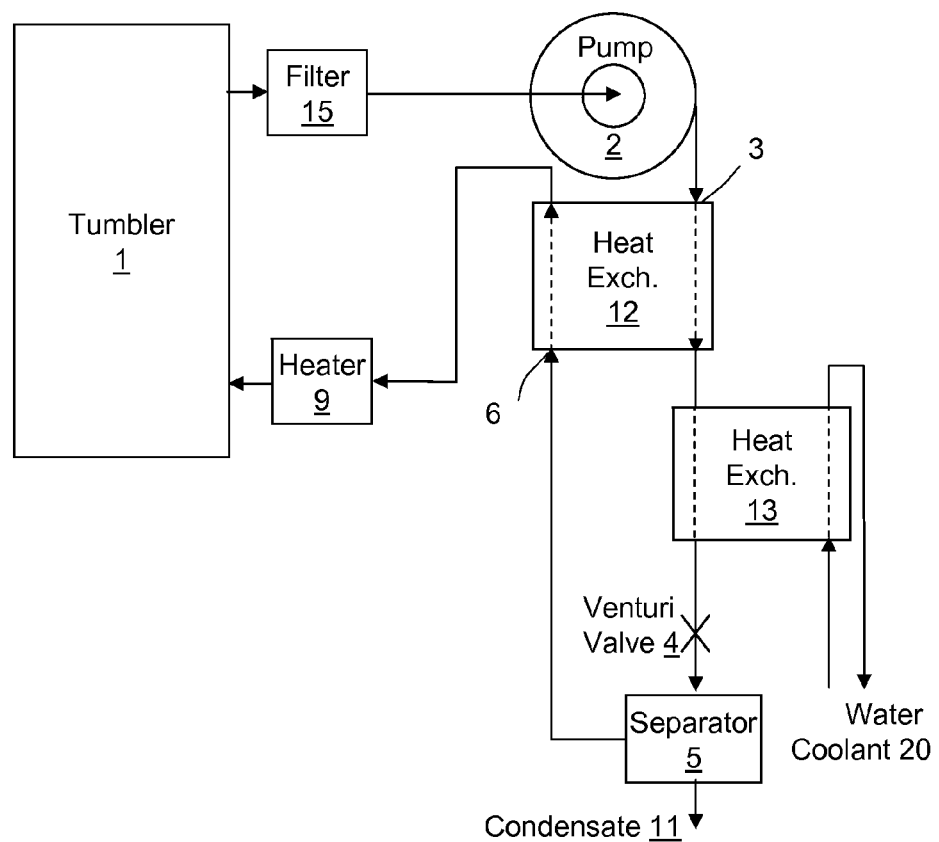
FIG. 5C illustrates how a second heat exchanger can be positioned between the primary heat exchanger and the expander.

FIG. 5C illustrates how a second heat exchanger 13 can be positioned between the primary heat exchanger 12 and the expander 4. This secondary heat exchanger 13 would utilize an available source of cold fluid such as outside air or tap water 20.

Figure 6:
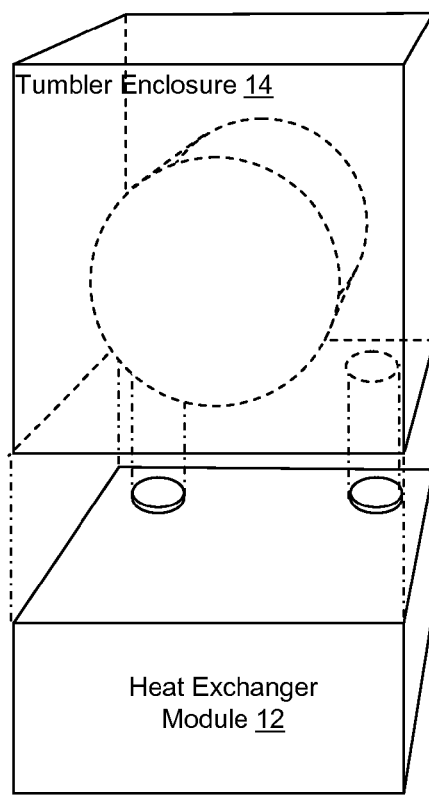
FIG. 6 shows how the device could be constructed in module by separating for example the heat exchanger from the tumbler module.

The dryer can be built in modular fashion. For example as shown in FIG. 6, the heat exchanger module 12 can be built in a separate compartment from the tumbler 1 and the enclosure 14 of the tumbler can be made of hinged plates for easy storage, transportation and assembly.

This invention has the following advantages:

1. Completely Green: Air itself is used as a refrigerant and therefore no global warming refrigerant fluid is required. Conventional refrigerant fluids, (hydrochlorofluorocarbons or HCFCs), have a global warming potential 2000 times that of carbon dioxide and are employed by conventional heat pump dryers.
2. Closed Loop: Air is recirculated; no venting or exhaust is required except that condensate water must be drained.
3. Efficient: The proposed technology has better performance than a conventional heat pump dryer because of the greater efficiency of the heat exchangers. In the proposed dryer, heat needs to traverse only two boundary layers and a single heat exchanger wall (air/wall/air). In conventional heat pump dryers, heat must cross four boundary layers and two heat exchanger walls (air/wall/fluid, fluid/wall/air).
4. Energy Regenerating: In both proposed versions, heat is recirculated through the heat exchanger 12. Furthermore, in Version 2, mechanical energy is recycled from the turbine 8 to the compressor 2. This approach minimizes the heat transferred to the indoor environment.
5. Simple, Compact and Economical Design: The proposed dryer is simpler, more compact and more economical than a conventional heat pump because it requires only one heat exchanger instead of two.
6. Low Heat Emission: Because of the high efficiency of the proposed design, very little heat is dumped into the environment. Unlike in a traditional dryer, the proposed dryer does not rely on heating of the air beyond the adiabatic heating by the compressor. Hybrid options, shown in FIG. 5, include a heater 9 for heating the air before it enters the tumbler 1; a bleed of valve 10 for bleeding off the air to create a partial vacuum in the tumbler 1; and a secondary heat exchanger 14 for cooling the air before the separator.
7. Thermodynamically Reversible (Version 2 Only): The process described in FIG. 5 is thermodynamically reversible. This means that in theory, assuming no friction, no turbulence, a perfect heat exchanger and no temperature difference between the clothes and the condensate, zero energy is required to dry clothes. Water leaves the system in liquid form, that is, in the same phase as it enters it and therefore no energy needs to be spent on vaporizing water. Of course, in practice, the process includes friction and turbulence and needs to be driven forward and therefore, energy must be expended. However, the proposed technology has the potential for requiring significantly less energy than any other competing clothes drying technique.

8. Hybrid Operation Possible. The proposed dryer can easily incorporate features from other approaches such as a heater and vacuum.
9. Modular Construction Possible. The proposed dryer can be modular, with the tumbler, heat exchanger and pump/venture or compressor/turbine constructed in module to be assembled on board.

References: Design and Experimental Study of High-Speed Low-Flow-rate Centrifugal Compressors by Fulin Gui, Thomas R. Reinarts, and Robert P. Scaringe, Mainstream Engineering Corporation, and Joseph M. Gottschlich USAF Wright Laboratory. IECEC Paper No. CT39, ASME 1995.

Even though the description above is directed to a dryer for clothes, it should be clear to anyone versed in the arts that the same technology can be used to dry a wide diversity of other objects.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

I claim:

1. A dryer for drying wet objects using an air cycle, comprising
   a. a tumbler enclosure holding a tumbler and having an air input and an air output;
   b. a compressor having an input and an output, said compressor input connected to said tumbler enclosure output;
   c. a heat exchanger, said heat exchanger having a hot side and a cold side, each said side having an input and an output, said hot side input connected to said compressor output;
   d. an expander having an input and an output, said expander's input connected to said heat exchanger's hot side output;
   e. an air-vapor separator having an air input, an air output and a liquid output, said separator's air input connected to said expander's output;
   f. said separator's air output connected to said heat exchanger's cold side input; and
   g. said heat exchanger cold side output connected to said tumbler enclosure's input;
   wherein air flows in a loop, from said tumbler enclosure where said air acquires moisture, to said compressor where said air is essentially adiabatically compressed and heated, then flows to said heat exchanger where said air is cooled, then flows to said expander where said air is essentially adiabatically expanded and further cooled, then flows to said separator where condensate is removed and said air is dried, then flows back to said heat exchanger where said air is heated, then finally flows back to said tumbler enclosure where said air captures moisture, thereby completing said loop.

2. The dryer of claim 1 wherein said expander is a Venturi valve.

3. The dryer of claim 2 wherein said tumbler enclosure is sealed off from the atmosphere, and also wherein said dryer also comprises a bleed valve inserted between said compressor and said Venturi valve, said compressor outputting compressed air, part of said compressed air being bled off by said bleed valve, thereby generating a partial vacuum in said tumbler enclosure.

4. The dryer of claim 1 wherein said expander is a turbine.

5. The dryer of claim 4 wherein said tumbler enclosure is sealed off from the atmosphere, and also wherein said operation of said compressor and said turbine is adjusted to produce a partial vacuum in said tumbler enclosure.

6. The dryer of claim 1 also comprising a second heat exchanger inserted between said expander's output and said separator's air input and configured to further cool said air.

7. The dryer of claim 1 wherein said heat exchanger is named primary heat exchanger, said dryer also comprising a secondary heat exchanger inserted between said primary heat exchanger hot side output and said expander's input and configured to further cool said air.

8. The dryer of claim 1 also comprising a heater inserted between said heat exchanger cold side's output and said tumbler enclosure's input, said heater configured to heat air flowing from said heat exchanger to said tumbler enclosure.

9. The dryer of claim 1 wherein said loop is a closed loop.

10. The dryer of claim 1 wherein said loop is a partially open loop, comprising at least one air insertion device or air bleed off device.

11. The dryer of claim 1 wherein said objects are clothes.

12. A method for drying wet objects, comprising
    a. passing air through said wet objects thereby having air absorb moisture from said wet objects;
    b. compressing said air, thereby heating it;
    c. extracting heat from said air by passing said air through the hot side of a heat exchanger, thereby cooling said air, and furthermore said heat exchanger having a cold side;
    d. expanding said air, thereby cooling it further, below its dew point;
    e. separating condensate from said air;
    f. restoring all or part of said heat to said air by passing said air through said heat exchanger's cold side, thereby warming said air; and
    g. redirecting all or part of said air back to said wet objects thereby forming a loop in the flow of said air.

13. The drying method of claim 12 wherein the step of expanding said air is performed by a Venturi valve.

14. The drying method of claim 12 wherein said expanding step is performed by a turbine.

15. The drying method of claim 12 also comprising the step of bleeding some of said air from said loop, bleeding step configured to create a partial vacuum in said tumbler enclosure.

16. The drying method of claim 12 also comprising the step of passing said air through a second heat exchanger just before the step of separating said condensate from said air, said second heat exchanger configured to further cool the air.

17. The drying method of claim 12 wherein said heat exchanger is named primary heat exchanger, said drying method also comprising the step of passing said air through a secondary heat exchanger just before the step of expanding said air, said second heat exchanger configured to further cool the air.

18. The drying method of claim 12 also comprising the step of heating the air just before redirecting said air back to said wet objects.

19. The drying method of claim 12 also comprising the steps of bleeding off some air from said loop at one or more points around said loop and adding some air to said loop at others one or more points around said loop.

20. The drying method of claim 12 wherein said wet objects are clothes.

* * * * *